United States Patent
Ashihara

(10) Patent No.: US 6,339,392 B1
(45) Date of Patent: Jan. 15, 2002

(54) GATE FOR RADAR-MOUNTED VEHICLE, HAVING PARTITION WALLS NOT GROUPED OR DETECTED BY RADAR APPARATUS

(75) Inventor: Jun Ashihara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/460,424

(22) Filed: Dec. 14, 1999

(30) Foreign Application Priority Data

Jan. 13, 1999 (JP) .............................. 11-006263

(51) Int. Cl.⁷ .............................................. H01Q 17/00
(52) U.S. Cl. .................................. 342/1; 342/3; 342/4
(58) Field of Search ................................. 342/1, 2, 3, 4

(56) References Cited

U.S. PATENT DOCUMENTS

| | | | | |
|---|---|---|---|---|
| 3,737,903 A | * | 6/1973 | Suetake et al. | 342/1 |
| 4,906,998 A | * | 3/1990 | Shibuya | 342/4 |
| 5,121,122 A | * | 6/1992 | Frye | 342/1 |
| 5,223,327 A | * | 6/1993 | Bihy | 428/195 |
| 5,230,763 A | * | 7/1993 | Roth et al. | 156/254 |
| RE36,095 E | | 2/1999 | Urabe et al. | 342/133 |
| 6,184,815 B1 | * | 2/2001 | Carlson | 342/4 |

FOREIGN PATENT DOCUMENTS

| | | | |
|---|---|---|---|
| DE | 43 10 580 A1 | 10/1994 | |
| EP | 0 002 469 A1 | 6/1979 | |
| EP | 0 840 140 | 5/1998 | |
| EP | 0 856 433 A1 | 8/1998 | |
| JP | 01044097 A * | 2/1989 | H05K/9/00 |
| JP | 08181482 A * | 7/1996 | H05K/9/00 |
| JP | 8-181535 | 7/1996 | |
| JP | 8-235490 | 9/1996 | |

* cited by examiner

*Primary Examiner*—John B. Sotomayor
(74) *Attorney, Agent, or Firm*—Armstrong, Westerman, Hattori, McLeland & Naughton

(57) ABSTRACT

A gate such as a tollgate in an expressway for radar-mounted vehicles is disclosed, by which an erroneous operation of the mounted radar apparatus can be prevented and through which the radar-mounted vehicles can smoothly pass. The gate includes two partition walls which limit a passage. The positions of the front ends of the partition walls are separated in front and behind, or the front end of one or both of the partition walls has a structure for suppressing the frontward reflection of each radiated electric, optical, or acoustic beam incident on the relevant front end.

9 Claims, 4 Drawing Sheets

GATE FOR RADAR-MOUNTED VEHICLE, HAVING PARTITION WALLS NOT GROUPED OR DETECTED BY RADAR APPARATUS

BACKGROUND OF THE INVENTION

1. Field of the Invention

The present invention relates to a gate for vehicles having a radar apparatus used for preventing a collision between vehicles.

This application is based on Patent Application No. Hei 11-6263 filed in Japan, the contents of which are incorporated herein by reference.

2. Description of the Related Art

As a constituent of a collision or clash preventing system mounted in a vehicle, a radar apparatus has been developed for detecting the distance to an object such as a vehicle ahead of or approaching the present vehicle. Recently, a scanning radar apparatus for detecting not only the distance to the object, but also the direction of the object (observed from the present vehicle) has also been developed.

Such a scanning radar apparatus comprises a plurality of antennas, each antenna being arranged in a slightly different direction and thus radiating a beam in a slightly different direction and receiving a reflected beam from the relevant direction. The beams from these antennas are sent (and received) in turn, that is, not sent or received simultaneously, thereby determining the antenna which receives the reflected wave, that is, the direction of the generated reflected wave.

In the above scanning radar apparatus, each radio wave sending/receiving direction is called a channel, and the apparatus is called a multi-channel radar apparatus. This type of apparatus is an electronic scanning apparatus; however, the mechanical scanning by mechanically changing or deflecting the direction of a wave-sending/receiving antenna may also be used for detecting the direction of an object from which the reflected wave is generated and received.

As the directional resolution of the above-described type of scanning radar apparatus has improved, simultaneous multi-channel detection of an object (such as a vehicle ahead of the present vehicle) has become more common. In most of such radar apparatuses mounted in a vehicle and having high resolution, the reflected waves detected for each direction or each channel are divided into groups or clusters based on a predetermined characteristic, so that a target object from which the reflected waves are generated is presumed and detected. The following are examples for the characteristics used for the grouping: (i) the distance between the present vehicle and each reflection point (from which the relevant reflected wave was generated) is approximately the same over a plurality of adjacent channels, or (ii) the relative velocity of each reflection point with respect to the present vehicle is approximately the same.

When a vehicle or car having the above-explained scanning radar apparatus passes through a gate of an expressway or the like, the front ends of the left and right partitions walls (which limit the passage) are detected using the radar apparatus. In an example gate as shown in FIG. 6A, the left and right partitions P and Q which limit the left passage are respectively detected as reflection points p and q (see FIG. 6B) by using two adjacent channels. These two reflection points p and q are at approximately the same distance, and are also close to each other.

If a typical grouping is performed for these two reflection points p and q, then as shown by the dotted oval in FIG. 6B, it is judged that the reflection points are present on a continuum such as a large vehicle or a building (or structure). Such an incorrect judgment leads to the incorrect judgment that an obstacle is present in front of the present vehicle, so that an alarm may be raised for the driver, or an automatic control may be executed in the vehicle.

The above incorrect judgment can be prevented by interrupting the radar operation before the present vehicle passes through the gate, and restarting the radar operation after the vehicle has passed through the gate. However, to switch off and on the radar apparatus at a suitable timing imposes a great burden on the driver. In particular, if the vehicle passes through a non-stop type gate which will probably come into wide use, the above off/on switching must be performed very quickly. If such a quick switching cannot be performed, the vehicle may be automatically stopped, or a safety problem may occur due to failure to restart the radar after passing through the gate.

SUMMARY OF THE INVENTION

In consideration of the above circumstances, an objective of the present invention is to provide a gate which does not cause erroneous operation of a vehicle having a radar apparatus, without interrupting the radar apparatus when the vehicle passes the gate.

Therefore, the present invention provides a gate having a passage through which a radar-mounted vehicle passes, the vehicle having a radar apparatus which radiates electric, optical, or acoustic beams in a plurality of directions and receives reflected waves from an object so as to detect the object which generates the reflected waves, and the gate comprising two partition walls which limit the passage, the front ends of the partition walls being separately positioned along the direction of the passage. According to this structure, the front ends of the partition walls are not grouped by the radar apparatus even if a grouping operation is performed.

The present invention also provides a similar gate having the same basic structure, but the front end of only one of the partition walls has a structure for suppressing the frontward reflection of each incident radiated beam. Also in this structure, the front ends of the partition walls are not grouped by the radar apparatus even if a grouping operation is performed.

The present invention also provides a similar gate having the same basic structure, but the front ends of the partition walls have a structure for suppressing the frontward reflection of each incident radiated beam. According to this structure of the gate, the above front ends are not detected by the radar apparatus.

The following are preferable example methods for realizing the structure of the relevant front end for suppressing the frontward reflection of the beam:

(1) covering the front end with a material for absorbing the beam, (2) inclining the front face of the front end in a manner such that the height of the relevant portion gradually decreases frontward, and (3) forming a concavoconvex (i.e., regularly fluted or grooved) pattern on the front end so as to disperse the reflective directions of the incident beams.

As explained above, one or both of the partition walls detected by the radar apparatus are not grouped by the radar apparatus in a grouping operation, or both partition walls are not detected by the radar apparatus. Therefore, it is possible to effectively solve the problem relating to automatic control based on an incorrect judgment or determination of the radar apparatus.

BRIEF DESCRIPTION OF THE DRAWINGS

FIG. 1A is a front view of the gate, FIG. 1B is a plan view of only the partition walls of the gate, and FIG. 1C shows reflection points detected by the radar apparatus mounted in the vehicle.

FIG. 2A is a front view of the gate, and FIG. 2B shows reflection points detected by the radar apparatus mounted in the vehicle.

DESCRIPTION OF THE PREFERRED EMBODIMENTS

Hereinafter, gates as embodiments according to the present invention will be explained in detail with reference to the drawings.

Figure 1A:
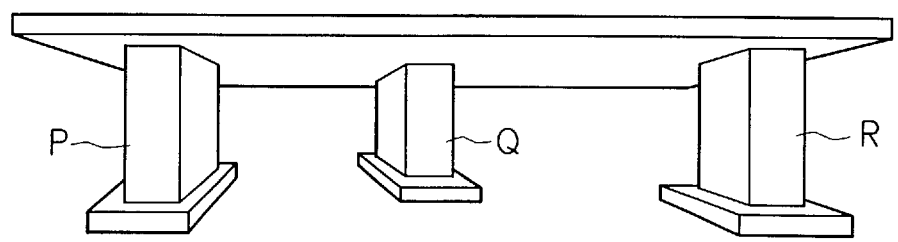
FIGS. 1A to 1C are diagrams showing and explaining the structure of a gate for a radar-mounted vehicle, as an embodiment of the present invention.
Figure 1B:
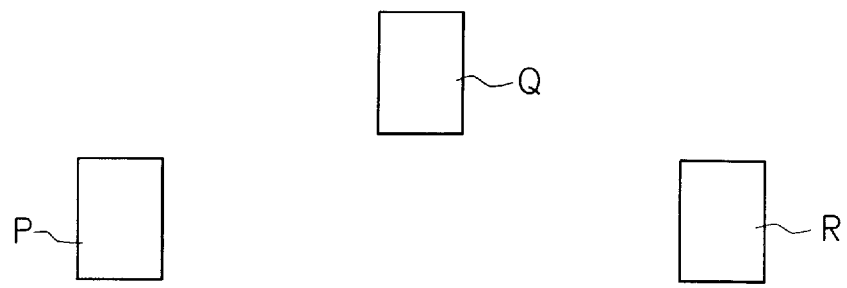
Figure 1C:
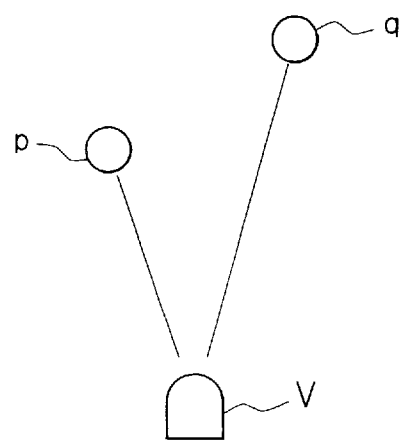

FIGS. 1A to 1C are diagrams showing and explaining the structure of a gate for a radar-mounted vehicle, as an embodiment of the present invention. FIG. 1A is a front view of the gate, FIG. 1B is a plan view of only the partition walls of the gate, and FIG. 1C shows reflection points detected by the radar apparatus mounted in the vehicle.

The vehicle-mounted radar apparatus related to this embodiment has a multi-channel structure in which millimeter wave FM signals are sent towards different forward directions, and the generated reflected waves are received so as to detect the distance to and direction of the object which generates the reflected waves.

The gate of the present embodiment consists of partition walls P, Q, and R which limit the passages, and a ceiling supported by the partition walls. The partition walls P, Q, and R have the function of limiting the passages through which each vehicle passes, and another function of providing space for a person engaged in the collection of tolls or an automatic toll-collecting machine. As shown in the plan view of FIG. 1B, the center wall Q is positioned to the rear of left and right partition walls P and Q.

As shown in FIG. 1C, it is assumed that a radar-mounted vehicle V, which is passing through the left-side passage of the above gate, is currently positioned in front of this gate. In this situation, the front ends of walls P and Q, detected by the radar apparatus, are separately positioned along the direction of the passage, as shown by reflection points p and q in the figure. As a result, even if a grouping operation for detecting reflection points is performed in this radar apparatus, it is possible to prevent an incorrect judgment such as detecting a continuum such as a large vehicle or structure, including the above reflection points p and q, because these reflection points are sufficiently separated.

In addition, the spacing between the reflection points p and q is larger than the width of present vehicle V; thus, it is determined that these reflection points do not obstruct or disturb the passing of the present vehicle V. Therefore, except for a special case such that the relative velocity between the reflection point and the present vehicle is excessive, no alarm to the driver nor automatic control of the present vehicle is performed. Similar a determination is performed when a vehicle passes through the right-side passage.

Figure 2A:
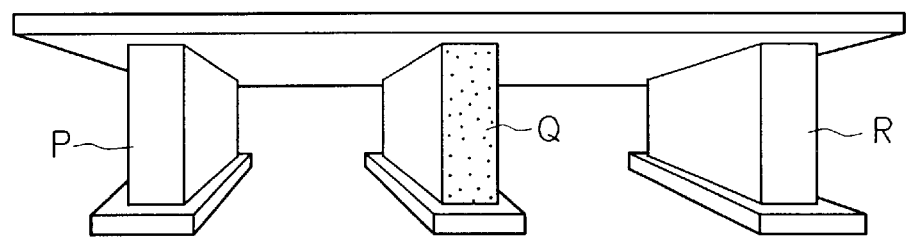
FIGS. 2A and 2B are diagrams showing and explaining the structure of a gate for a radar-mounted vehicle, as another embodiment of the present invention.
Figure 2B:
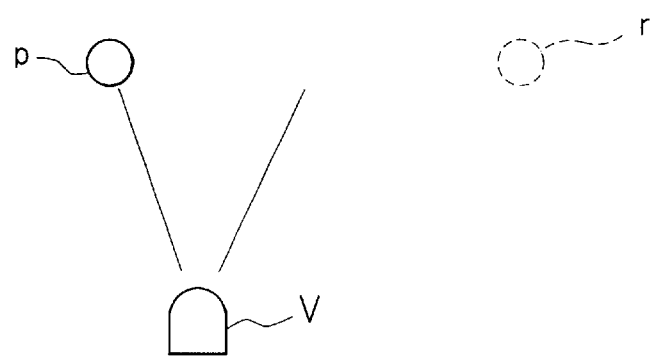

FIGS. 2A and 2B are diagrams showing and explaining the structure of a gate for a radar-mounted vehicle, as another embodiment of the present invention. FIG. 2A is a front view of the gate, and FIG. 2B shows reflection points detected by the radar apparatus mounted in the vehicle. In this embodiment, among the partition walls P, Q, and R, an antireflection process for suppressing the reflection of waves is performed only for the front face of the center partition wall Q.

As shown in FIG. 2B, when a radar-mounted vehicle V, which is passing through the left-side passage limited by the partition walls P and Q of the gate, is currently present in front of the gate, only reflection point p corresponding to the front end of the left-side partition wall P is detected by the radar apparatus mounted in vehicle V, but no reflection point corresponding to the front end of the right-side partition wall Q is detected. Even if reflection point r (indicated by a dotted circle) corresponding to partition wall R is also detected and a grouping operation is performed, it is possible to prevent an incorrect judgment such as presuming a continuum such as a wall including the above reflection points p and r because these reflection points are sufficiently separated.

As the antireflection process performed on the front face, the following methods may be employed, that is, (i) covering the front face with a wave absorbing material such as a ferrite, (ii) forming an irregular concavoconvex (i.e., regularly fluted or grooved) pattern on the front face so as to disperse the reflective directions of incident waves, and (iii) forming regular V-shape grooves on the front face so as to confine and attenuate each incident wave by multi-reflecting the wave.

Figure 3:
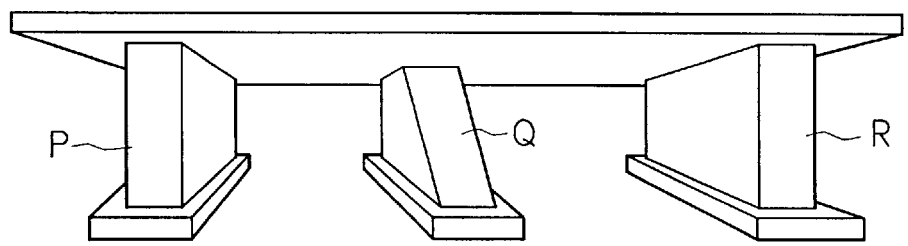
FIG. 3 is a front view showing the structure of a gate for a radar-mounted vehicle, as another further embodiment of the present invention.

FIG. 3 is a diagram showing and explaining the structure of a gate for a radar-mounted vehicle, as another further embodiment of the present invention, and this figure is a front view of the gate. In this embodiment, among the partition walls P, Q, and R, only the center partition wall Q has an inclined front face by which the height of the relevant portion gradually decreases frontward as shown in FIG. 3. Most part of the incident radio wave, radiated from the radar-mounted vehicle and then incident on the above inclined front face of the partition wall, is reflected and transmitted upward. As a result, the portion of the reflected wave transmitted towards the radar-mounted vehicle is suppressed. Therefore, a result and effect similar to those of the embodiment shown by FIGS. 2A and 2B can be obtained.

Figure 4:
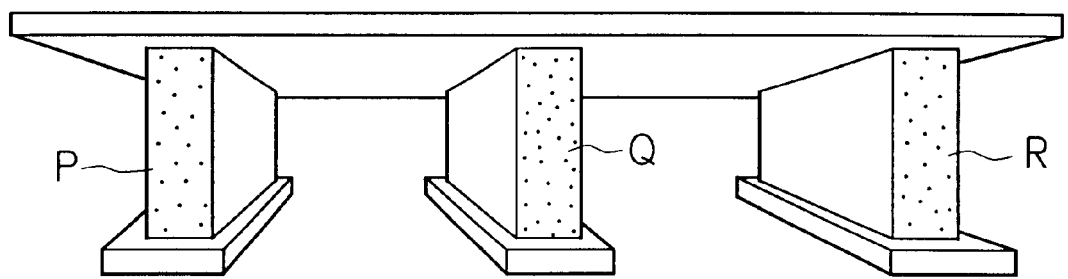
FIG. 4 is a front view showing the structure of a gate for a radar-mounted vehicle, as another further embodiment of the present invention.

FIG. 4 is a diagram showing and explaining the structure of a gate for a radar-mounted vehicle, as another further embodiment of the present invention, and this figure is a front view of the gate. In this embodiment, an antireflection process is performed for the front faces of all the partition walls P, Q, and R, for example, these faces are covered with a wave absorbing material. Accordingly, neither reflection point corresponding to each partition wall is detected, that is, no partition wall is detected as when the operation of the radar apparatus is interrupted.

Figure 5:
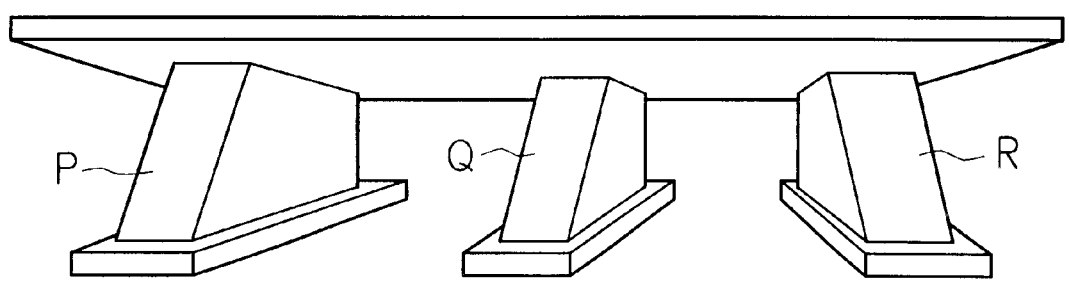
FIG. 5 is a front view showing the structure of a gate for a radar-mounted vehicle, as another further embodiment of the present invention.
Figure 6A:
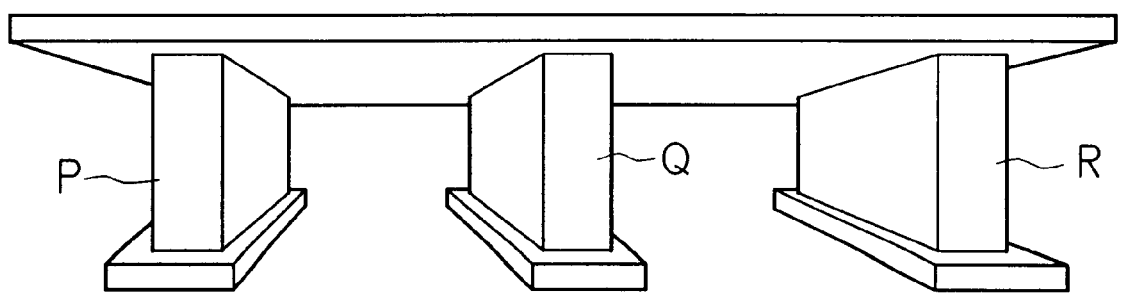
FIG. 6A is a front view of a typical conventional gate.
Figure 6B:
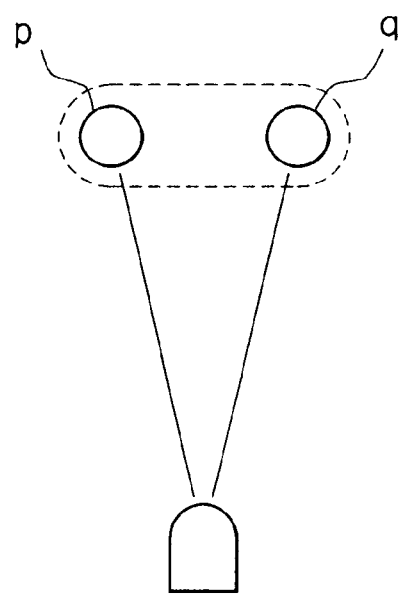
FIG. 6B shows reflection points detected by the radar apparatus mounted in the vehicle.

FIG. 5 is a diagram showing and explaining the structure of a gate for a radar-mounted vehicle, as another further embodiment of the present invention, and this figure is a front view of the gate. In this embodiment, the front faces of all the partition walls P, Q, and R are inclined in a manner such that the height of each relevant portion gradually decreases frontward as shown in FIG. 5. Most of the incident wave, radiated from the radar-mounted vehicle and then incident on the above inclined front face of each partition wall, is reflected and transmitted upward. As a result, the portion of the reflected wave transmitted towards the radar-mounted vehicle is suppressed. Therefore, no reflection point corresponding to either partition wall is detected, and a result and effect similar to those obtained when the operation of the radar apparatus is interrupted can be obtained.

Instead of inclining each front face as explained above, (i) the opposite inclination direction may be employed so as to reflect the wave downward, or (ii) the front face may be inclined right or leftward so as to reflect the wave right or leftward. Also in these cases, the frontward refection can be suppressed.

In the above-explained embodiments, only the front face (s) of the partition wall(s) are antireflection-processed so as to suppress the reflected wave. However, such an antireflection process may be performed for a front portion of each partition wall, which includes, for example, a front portion of a side face adjacent to the front face, if necessary.

Also in the above embodiments, a tollgate in an expressway or the like is shown as an example. However, the kind of the gate is not limited to such a tollgate, but the present invention can be applied to various kinds of gates having one or more passages, such as a gate for going in and out the premises of an office.

Also in the above embodiments, an incorrect judgment due to a grouping operation of the radar apparatus is shown. However, the gate of the present invention is also effective with respect to a radar-mounted vehicle having a low directional resolution by which a target passage between the partition walls cannot be detected and an incorrect judgment of being impassable may be obtained.

Also in the above embodiments, the radar apparatus radiates a radio wave beam and receives the reflected wave. However, the gate according to the present invention may be applied to vehicles which employ a radar apparatus which radiates an optical beam such as a laser beam or an acoustic beam such as an ultrasonic wave and receives a generated reflected wave.

What is claimed is:

1. A gate having a passage through which a radar-mounted vehicle passes, the vehicle having a radar apparatus which radiates electric, optical, or acoustic beams in a plurality of directions and receives reflected waves from an object so as to detect the object which generates the reflected waves, and the gate comprising:

two partition walls which limit the passage, the front ends of the partition walls being separately positioned along the direction of the passage.

2. A gate having a passage through which a radar-mounted vehicle passes, the vehicle having a radar apparatus which radiates electric, optical, or acoustic beams in a plurality of directions and receives reflected waves from an object so as to detect the object which generates the reflected waves, and the gate comprising:

two partition walls which limit the passage, the front end of only one of the partition walls having a structure for suppressing the frontward reflection of each incident radiated beam.

3. A gate as claimed in claim 2, wherein the structure of the front end for suppressing the frontward reflection of the beam is made by covering the front end with a material for absorbing the beam.

4. A gate as claimed in claim 2, wherein the structure of the front end for suppressing the frontward reflection of the beam is made by inclining the front face of the front end in a manner such that the height of the relevant portion gradually decreases frontward.

5. A gate as claimed in claim 2, wherein the structure of the front end for suppressing the frontward reflection of the beam is made by forming a concavoconvex pattern on the front end so as to disperse the reflective directions of the incident beams.

6. A gate having a passage through which a radar-mounted vehicle passes, the vehicle having a radar apparatus which radiates electric, optical, or acoustic beams in a plurality of directions and receives reflected waves from an object so as to detect the object which generates the reflected waves, and the gate comprising:

two partition walls which limit the passage, the front ends of the partition walls having a structure for suppressing the frontward reflection of each incident radiated beam.

7. A gate as claimed in claim 6, wherein the structure of each front end for suppressing the frontward reflection of the beam is made by covering the front end with a material for absorbing the beam.

8. A gate as claimed in claim 6, wherein the structure of each front end for suppressing the frontward reflection of the beam is made by inclining the front face of the front end in a manner such that the height of the relevant portion gradually decreases frontward.

9. A gate as claimed in claim 6, wherein the structure of each front end for suppressing the frontward reflection of the beam is made by forming a concavoconvex pattern on the front end so as to disperse the reflective directions of the incident beams.

* * * * *